United States Patent
Kim et al.

(10) Patent No.: US 10,131,851 B2
(45) Date of Patent: Nov. 20, 2018

(54) METHOD FOR REMOVING METAL FROM HYDROCARBON OIL

(71) Applicants: SK INNOVATION CO., LTD., Seoul (KR); SK ENERGY CO., LTD., Seoul (KR)

(72) Inventors: Min Kyoung Kim, Seoul (KR); Jin Su Ham, Daejeon (KR); Ki Seok Choi, Daegu (KR); Chang Kuk Kim, Seoul (KR); Min Hoe Yi, Daejeon (KR)

(73) Assignees: SK Innovation Co., Ltd., Seoul (KR); SK Energy Co., Ltd., Seoul (KR)

( * ) Notice: Subject to any disclaimer, the term of this patent is extended or adjusted under 35 U.S.C. 154(b) by 97 days.

(21) Appl. No.: 15/233,199

(22) Filed: Aug. 10, 2016

(65) Prior Publication Data

US 2017/0051211 A1 Feb. 23, 2017

(30) Foreign Application Priority Data

Aug. 21, 2015 (KR) .................. 10-2015-0117797

(51) Int. Cl.
*C10G 17/00* (2006.01)
*C10G 17/04* (2006.01)
(Continued)

(52) U.S. Cl.
CPC .......... *C10G 17/04* (2013.01); *B01D 11/0446* (2013.01); *B01D 11/0488* (2013.01);
(Continued)

(58) Field of Classification Search
CPC . B01D 11/02; B01D 11/0211; B01D 11/0284; B01D 11/04; B01D 11/0419;
(Continued)

(56) References Cited

U.S. PATENT DOCUMENTS 3,449,243 A 6/1969 Strong et al.
4,778,589 A 10/1988 Reynolds
(Continued)

FOREIGN PATENT DOCUMENTS

CN 1982412 A 6/2007

OTHER PUBLICATIONS

European Search Report for EP 16 18 4753 dated Januaury 9, 2017 (8 pages).
(Continued)

*Primary Examiner* — Prem C Singh
*Assistant Examiner* — Brandi M Doyle
(74) *Attorney, Agent, or Firm* — Abelman, Frayne & Schwab

(57) ABSTRACT

Disclosed is a method of removing metals from hydrocarbon oil, comprising: supplying a feed including hydrocarbon oil; mixing the feed with an aqueous solution including a metal scavenger to prepare a first mixture; separating the first mixture into a first aqueous solution phase and a first hydrocarbon phase and discharging the separated first aqueous solution phase; mixing the separated first hydrocarbon phase with washing water to produce a second mixture; separating the second mixture into a second aqueous solution phase and a second hydrocarbon phase; and recovering the separated second hydrocarbon phase and recirculating the separated second aqueous solution phase.

12 Claims, 4 Drawing Sheets

(51) Int. Cl.
*C10G 31/08* (2006.01)
*C10G 17/02* (2006.01)
*B01D 11/04* (2006.01)
*C10G 53/06* (2006.01)

(52) U.S. Cl.
CPC .......... *B01D 11/0492* (2013.01); *C10G 17/02* (2013.01); *C10G 31/08* (2013.01); *C10G 53/06* (2013.01); *C10G 2300/205* (2013.01); *C10G 2300/4081* (2013.01); *C10G 2300/80* (2013.01)

(58) Field of Classification Search
CPC ............ B01D 11/0423; B01D 11/0446; B01D 11/0488; B01D 11/0492; C10G 17/00; C10G 17/02; C10G 17/04; C10G 7/04; C10G 21/08; C10G 21/28; C10G 21/30; C10G 31/08; C10G 33/00; C10G 33/04; C10G 53/06; C10G 2300/205; C10G 2300/4081
See application file for complete search history.

(56) References Cited

U.S. PATENT DOCUMENTS

| | | | |
|---|---|---|---|
| 4,778,590 A | | 10/1988 | Reynaols et al. |
| 4,853,109 A | * | 8/1989 | Reynolds ............... C10G 17/02 208/251 R |
| 5,080,779 A | * | 1/1992 | Awbrey ................ C10G 17/02 208/251 R |
| 2003/0217971 A1 | * | 11/2003 | Varadaraj ............ B01D 17/045 210/639 |
| 2007/0062849 A1 | | 3/2007 | Luo et al. |
| 2011/0120913 A1 | * | 5/2011 | Snawerdt ............... C10G 17/04 208/252 |

OTHER PUBLICATIONS

Chinese Office Action from Chinese Patent Application No. 2016106892092 dated Nov. 3, 2017.

* cited by examiner

METHOD FOR REMOVING METAL FROM HYDROCARBON OIL

CROSS-REFERENCE TO RELATED APPLICATION

This application claims the benefit of Korean Patent Application No. 10-2015-0117797, filed Aug. 21, 2015, entitled "Method for removing metals from hydrocarbon oil", which is hereby incorporated by reference in its entirety into this application.

BACKGROUND OF THE INVENTION

1. Technical Field

The present invention relates to a method of removing metals from hydrocarbon oil.

2. Description of the Related Art

With the recent excavation of new oil wells, crude oil native to West Africa, including Chad, Sudan, etc. (Doba, Kuito), crude oil native to the North Sea (Heidrun, Captain), crude oil native to China (Bobai, Shangri), crude oil native to Indonesia (Shering), and crude oil native to North America (San Joaquin Valley) are being produced. However, such crude oil has low quality, and may suffer from pollution of heat exchangers upon use thereof, difficulty in treating discharged materials, poisoning of catalysts due to specific metal salts, and other problems. Hence, in order to increase the competitiveness of the above crude oil, additional processing for treating metals that act as pollutants is required.

Among metals, calcium is mainly present in the form of calcium naphthenate in crude oil, and causes very serious problems. The problems with high-calcium crude oil are as follows: the separation of a water layer becomes problematic during a desalting process because calcium naphthenate functions as an emulsion stabilizer, whereby an excess of water is fed into a refining unit, or an excess of organic material is fed into a wastewater disposal unit, undesirably lowering the overall processing efficiency of crude oil. Furthermore, calcium remaining in the oil residue of the crude oil passed through the refining unit may deactivate the catalyst within a very short time during the catalytic cracking process using a fluid catalytic cracking unit (FCCU) or a residue fluidized catalytic cracking unit (RFCCU). Furthermore, when residue is combusted in a boiler, a large amount of calcium sulfate is produced in the boiler, undesirably drastically lowering the boiler efficiency. Hence, high-calcium crude oil needs an additional calcium treatment process before a typical refining process, and the demand for methods of efficiently removing calcium that are able to ensure economic benefits compared to when using general crude oil is increasing.

The emulsion mixture of the desalting process is guided into a desalting device including plates that are electrically charged and disposed parallel to each other. Under such an array, an oil and water emulsion is exposed to an electric field applied thereto. In the water droplets in the emulsion, induced dipoles are formed, thus causing electrostatic attractive force between water droplets to thereby lead to combined water droplets having a larger size. Consequently, the emulsion is separated into two phases, that is, an oil phase (an upper layer) and a water phase (a lower layer). The streams of desalted crude oil and effluent water are discharged from the desalting device.

U.S. Pat. No. 4,778,589 discloses a method of rising hydroxo-carboxylic acid, especially citric acid in an aqueous solution form, in order to remove calcium from a hydrocarbon oil fraction. When calcium is removed, calcium citrate is produced. Calcium citrate has low solubility in water and thus causes a large amount of precipitates to remain in the desalting unit, thus drastically lowering the calcium removal efficiency. Furthermore, since the aqueous solution is used, the pH of the aqueous solution is excessively increased upon the removal of calcium from a high-concentration hydrocarbon oil traction, undesirably causing corrosion of the processing unit.

U.S. Pat. No. 4,778,590 discloses a method of removing calcium using aminocarboxylic acid or salts thereof, especially EDTA (Ethylene Diamine Tetra Acetic, acid). However, EDTA, having low solubility in water, has to be provided in the form of a calcium scavenger aqueous solution using an excess of water, and is difficult to transport and is not easy to use, undesirably incurring economic and industrial defects.

The aforementioned patents adopt the manner in which an inorganic acid or an organic acid, especially a monoacid, diacid, or hydroxyl acid, is first dissolved in water to prepare a calcium scavenger concentrate, which is then diluted with a large amount of water in the desalting process, in order to remove calcium from the hydrocarbon oil fraction including crude oil.

Such a manner is used to increase the calcium removal efficiency by mixing, within a short time, the lipophilic layer corresponding to the hydrocarbon oil fraction with the water layer in which the calcium scavenger is dissolved, and the reaction is caused at the interface of two layers, which are not miscible. In the case where crude oil having a high calcium concentration is used, mixing is limited due to the viscosity, making it difficult to use a high-concentration mixing ratio.

In consideration thereof, there is a need to develop novel methods of effectively removing metal pollutants, especially calcium, from the feed including hydrocarbon oil However, metal pollutants in the crude oil are not limited to calcium, and thus embodiments of the present invention are intended to provide a method of effectively removing calcium from crude oil and additionally removing other metal pollutants, especially iron, other than calcium.

SUMMARY OF THE INVENTION

Accordingly, the present invention has been made keeping in mind the problems encountered in the related art, and embodiments of the present invention are intended to provide a method of removing metals from hydrocarbon oil, in which a metal scavenger having high solubility in water is used, the addition position of the metal scavenger is adjusted, and the aqueous solution phase, separated in the desalting process, is recirculated, thereby reducing the use of water in the whole process and easily and efficiently removing a metal component from she hydrocarbon oil.

A first aspect of the present invention provides a method of removing metals from hydrocarbon oil, comprising: (a) supplying a feed including hydrocarbon oil; (b) mixing the feed with an aqueous solution including a metal scavenger to prepare a first mixture: (c) separating the first mixture into a first aqueous solution phase and a first hydrocarbon phase, and discharging the separated first aqueous solution phase; (d) mixing the first hydrocarbon phase, separated in (c), with washing water to produce a second mixture; (e) separating the second mixture into a second aqueous solution phase and a second hydrocarbon phase; and (f) recovering the separated second hydrocarbon phase and recirculating the separated second aqueous solution phase back to (b).

In an embodiment of the present invention, in (d), the separated first hydrocarbon phase is further mixed with an additional metal scavenger, as well as the washing water.

In an embodiment of the present invention, the weight ratio of the metal scavenger in (b) to the additional metal scavenger in (d) (a weight of the metal scavenger in (b)/a weight of the additional metal scavenger in (d)) ranges from 1 to 4.

In an embodiment of the present invention, the additional meted scavenger in (d) is different from the metal scavenger in (b).

In an embodiment of the present invention, the metal scavenger removes calcium, iron or mixtures thereof from the hydrocarbon oil.

In an embodiment of the present invention, the metal scavenger is selected from the group consisting of adipic acid, malonic acid, glutaric acid, pyruvic acid, 3-hydroxypropanoic acid, mesaconic acid, and derivatives thereof.

In an embodiment of the present invention, the metal scavenger includes malonic acid or pyruvic acid.

In an embodiment of the present invention, the hydrocarbon oil includes 1 to 120 ppm of calcium and 1 to 20 ppm of iron.

In an embodiment of the present invention, the mixing in (b) and (d) is performed by a change in pressure ($\Delta P$) of 0.3 to 5.0 kgf/cm$^2$ at 10 to 200° C. for 1 sec to 2 hr.

In an embodiment of the present invention, (c) and (e) are performed at a temperature of 90 to 160° C. and a pressure of 1 to 20 bar.

In an embodiment of the present invention, in (b), the metal scavenger is added in an amount corresponding to a molar ratio of 0.5 to 10 times as much as the amount of calcium of the hydrocarbon oil.

In an embodiment of the present invention, in (d), the washing water is added in an amount of 3 to 10 wt % based on the weight of the hydrocarbon oil.

In an embodiment of the present invention, in (a), the feed further includes 1 to 20 ppm of a demulsifier.

In an embodiment of the present invention, (c) and (e) are performed using a device selected from the group consisting of a heater treater, an emulsion treater, a free water knockout vessel, and an electrostatic heater treater.

In an embodiment of the present invention, the feed is crude oil, atmospheric residue, vacuum residue, shale oil, oil sands, liquefied coal oil, or tar sands.

According to embodiments of the present invention, a method of removing metals from hydrocarbon oil adopts a metal scavenger, which has high solubility in water and is capable of efficiently removing a metal component, whereby metals, especially calcium or iron, can be efficiently removed from the hydrocarbon oil. Furthermore, in the method of removing metals from hydrocarbon oil, the addition position and the addition amount of the metal scavenger and washing water are adjusted, and washing water is recycled, thus the use of water can be reduced, so that the quality of erode oil and the selling price thereof can increase.

DESCRIPTION OF SPECIFIC EMBODIMENTS

Exemplary embodiments of the present invention may be achieved by the following description with reference to the appended drawings. The following description should be understood to explain specific embodiments of the present invention, and the present invention is not necessarily limited thereto.

As used herein, the terms may be defined as follows.

The term "emulsion" means that any one of two liquids, which are not dissolved and are not combined with each other, is dispersed in the form of particles in the other liquid. The system in which oil particles are dispersed in water is referred to as oil-in-water (o/w) emulsion, whereas the system in which water particles are dispersed in oil is referred to as water-in-oil (w/o) emulsion. In the present invention, oil is added wish an aqueous solution including a metal scavenger to thereby form a w/o emulsion.

The term "free water" means the portion, of the water in a hydrous system such as a crystal, aqueous solution, gel etc., which is in a normal water state, other than bound water. Free water shows the same vapor pressure as water, is easily fluidized, is frozen at 0° C. and dissolves other materials, but the functions of the free water are lost when the free water is converted into bound water.

The term "oil-water separation" means that oil and water are separated from each other. In the present invention, it means the phenomenon in which a mixture including a water emulsion, formed by mixing hydrocarbon oil with an aqueous solution including a metal scavenger, is separated into a hydrocarbon layer and an aqueous solution layer through agglomeration of the emulsion in the desalting device.

Removal of Metal from Feed

Figure 1:
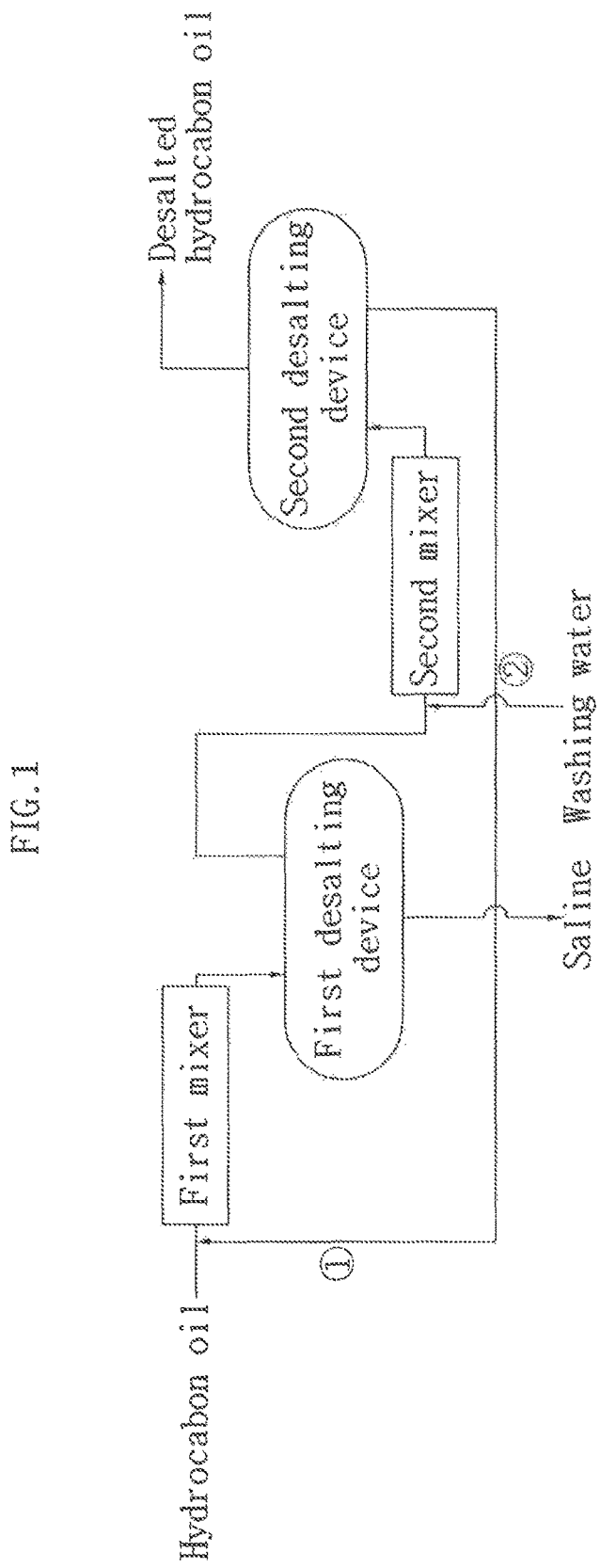
FIG. 1 schematically illustrates the process of removing metals from hydrocarbon oil according to an embodiment of the present invention.

FIG. 1 schematically illustrates the process of removing metals from hydrocarbon oil according to an embodiment of the present invention. As illustrated in FIG. 1, this method is described below.

The feed including hydrocarbon oil contains certain amounts of metal impurities. The metal removal process according to an embodiment of the present invention includes the removal of calcium, iron or mixtures thereof from hydrocarbon oil. In order to efficiently remove calcium or iron from the hydrocarbon oil, the hydrocarbon oil, which is fed to the above process, may include 1 to 120 ppm of calcium and 1 to 20 ppm of iron. Generally, hydrocarbon oil may contain 3000 ppm or less of calcium and 1000 ppm or less of iron, and such hydrocarbon oil, having high calcium and iron content, is mixed with another hydrocarbon oil having low calcium and iron content, whereby the metal content may be decreased and thus the resultant hydrocarbon oil may be suitable for use in processing.

Viscosity, solubility in water, and electrical conductivity are changed depending on the temperature of the feed, and changes in the properties of the feed have an influence on the subsequent desalting process. Specifically, when the temperature is increased, the viscosity is lowered and thus the rate of water-oil separation may increase, and also, the electrical conductivity of crude oil is increased, thus increasing the power consumption of an electrical device in the desalting device, and causing overloading. Therefore, taking into consideration the effects of viscosity, water solubility and electrical conductivity depending on the temperature of the feed, the temperature of the feed may be adjusted to an appropriate level so as to realize efficient desalting. As necessary, the temperature of the feed may be adjusted in advance using a preheater.

The feed is mixed with the aqueous solution including a metal scavenger. The aqueous solution including a metal scavenger is a mixture comprising the metal scavenger that is added at fee first position of FIG. 1 and the aqueous solution that is separated in the second desalting device and thus recirculated. The feed and the aqueous solution including a metal scavenger are mixed using the first mixer of FIG. 1 to give a first mixture. Through mixing rising the first mixer, emulsion of water in oil may be formed, and the size and shape of the emulsion may be controlled depending on the mixing rate and the mixing time of the mixer. Typically, the metal component in the feed produces a metal salt with the metal scavenger. As such, it is important to adjust the mixing rate and the mixing time so that the metal substitution reaction between the metal that is present in a small amount in the viscous feed and the metal scavenger is efficiently carried out. The metal component, for example, calcium, may react with carboxylic acid as the metal scavenger to produce calcium dicarboxylate. In an embodiment of the present invention, the mixing of the aqueous solution including the metal scavenger and the feed is performed for a mixing time ranging from 1 sec to 2 hr, particularly 1 sec to 1 hr, and more particularly 30 min or less, and the mixing rate may be adjusted by changing the pressure ($\Delta P$) in the pipes, and the change in pressure may range from 0.3 to 5.0 kgf/cm$^2$, and particularly from 0.3 to 2.0 kgf/cm$^2$. Since excessive mixing is unfavorable in terms of the subsequent water-oil separation, the size and shape of the emulsion have to be adjusted through appropriate mixing.

The produced first mixture may be present in the form of a feed that is an oil component including an emulsion as a water component, and the first mixture is transferred into a first desalting device, thus separating a first aqueous solution phase and a first hydrocarbon phase from each other. Specifically, the first mixture including the emulsion is separated into the aqueous solution phase and the hydrocarbon phase through water-oil separation in the first desalting device, and the detailed water-oil separation mechanism is described below.

The emulsion, which is present in the form of droplets in the oil component such as hydrocarbon oil, is electrically charged in an electric field in the first desalting device, and the electrically charged emulsion agglomerates due to electrical attractive force. The agglomerating emulsion precipitates due to its specific gravity, and thus a hydrocarbon phase and an aqueous solution phase are separated from, each other.

Although the emulsion may favorably agglomerate at high temperature and low pressure in consideration only of the flowability of the emulsion, water solubility and electrical conductivity also have to be considered depending on the temperature and the pressure as mentioned above, and thus the desalting device needs to be maintained at an appropriate temperature and pressure. In an embodiment of the present invention, the desalting device may operate to carry out water-oil separation at a temperature of 90 to 160° C. and a pressure of 1(atmospheric pressure) to 20 bar. Moreover, an additive may be used to increase water-oil separation efficiency in the desalting device, and a typical demulsifier known in the corresponding field may be used.

In the present invention, the desalting device is not particularly limited as to the kind and shape thereof, so long as the mixture comprising the feed and the aqueous solution including a metal scavenger may be separated into the hydrocarbon phase and the aqueous solution phase. In an embodiment of the present invention, the desalting device may be selected from the group consisting of a heater treater, an emulsion treater, a free water knockout vessel, and an electrostatic heater treater.

The first mixture may be separated into the first aqueous solution phase and the first hydrocarbon phase using the first desalting device, and the first aqueous solution phase is a saline containing a large amount of metal salt formed using the metal scavenger, and the separated first aqueous solution phase is discharged to the outside. Meanwhile, the separated first hydrocarbon phase is mixed with washing water supplied from outside in the second mixer, thus producing a second mixture. In an embodiment of the present invention, the washing water may be added in an amount of 3 to 10 wt %, and particularly 4 to 7 wt %, based on the weight of the hydrocarbon oil. The amount of washing water that is added may vary depending on the properties of the hydrocarbon oil, and the amount of washing water should be increased when the hydrocarbon oil is heavier oil. If the amount of washing water is less than 3 wt %, the distance between the produced emulsion particles may increase, making it difficult to realize efficient agglomeration. On the other hand, if the amount thereof exceeds 10 wt %, a carryover phenomenon may occur, and unnecessary energy loss may be caused in a heater by the large amount of water.

As for the addition position of washing water, to recycle the aqueous solution phase, which is separated using the second desalting device, the washing water may be added between the first desalting device and the second desalting device.

The washing water may be neutral water at a pH of 6 to 8. NH$_3$ is combined with naphthenic acid in crude oil and thus functions as an emulsifier to promote the production of an emulsion, and CT may cause corrosion, and thus, each of NH$_3$ and CT is added in as small an amount as possible. The addition of washing water at 82° C. or more facilitates subsequent water-oil separation in the second desalting device.

In an embodiment of the present invention, the washing water that is added upstream of the second desalting device may be fed together with the metal scavenger. When the metal scavenger is further added upstream of the second desalting device, the metal removal efficiency of the second desalting device may increase, and the metal scavenger may be recirculated back to the first desalting device via a second aqueous solution phase, thus increasing the efficiency of use of the metal scavenger. When the metal scavenger is divided and added at the first and second positions of FIG. 1, the amount of the metal scavenger added at the second position may be equal to or smaller than the amount of the metal scavenger added at the first position. More specifically, the weight ratio of the amount of the metal scavenger added at the first position to the amount of the metal scavenger added at the second position (first position/second position) may range from 1 to 4. If the weight ratio is less than 1, the amount of the metal scavenger that is not consumed in the first desalting device, having a relatively high metal content, may decrease, thus lowering the overall desalting efficiency. On the other hand, if the weight ratio exceeds 4, there is no divided addition effect and an effect similar to that of the singular addition of the entire amount of the metal scavenger may result.

The washing water and the first hydrocarbon phase are mixed in the second mixer. The size and shape of the emulsion should be adjusted so as to facilitate subsequent water-oil separation in the second mixer, and second mixing is performed under conditions similar to the mixing time and the mixing rate of the first mixer. The second mixture thus produced is present in a form in which the emulsion, as the water component, is formed in the hydrocarbon oil phase.

The second mixture is transferred into the second desalting device, and water-oil separation is performed in the second desalting device, thereby separating a second hydrocarbon phase and a second aqueous solution phase from each other. The operating conditions of the second desalting device are not significantly different from those of the first desalting device, provided that the temperature and pressure may be adjusted depending on the properties of the second mixture. The separated second hydrocarbon phase is recovered from the top of the second desalting device, and the second aqueous solution phase is recirculated upstream of the first mixer and is thus mixed with the feed. The recirculated second aqueous solution phase is mixed with the metal scavenger at the first position of FIG. 1 before mixing with the feed in the first mixer. When the metal scavenger is added at the first position, the metal scavenger that is consumed in the form of a metal salt in the second desalting device is supplemented, thus increasing the efficiency of metal removal of the first desalting device. In an embodiment of the present invention, the total amount of the metal scavenger that is added through the first and second positions may be expressed as a molar ratio, 0.5 to 10 times, particularly 0.5 to 5 times, and more particularly 0.5 to 2.5 times as much as the amount of calcium of the hydrocarbon oil. If the added amount is less than 0.5 times, the removal efficiency may decrease in the terms of equivalent reaction. On the other hand, if the added amount exceeds 20 times, processing costs and post-treatment costs in wastewater disposal plants after the desalting process may greatly increase.

Hydrocarbon Feed

In an embodiment of the present invention, examples of the feed from which a metal component such as calcium or iron is removed may include, but are not necessarily limited to, crude oil, atmospheric residue, vacuum residue, shale oil, oil sands, liquefied coal oil. and tar sands. Although the constituents of the feed may vary depending on the kind of feed, the feed is mainly regarded as a feed containing hydrocarbon oil. As mentioned above, in the case where the feed contains large amounts of metal impurities, it is mixed with another feed containing small amounts of metal impurities and then the resulting mixture is applied to the metal removal process according to the present invention, thus increasing the metal removal efficiency.

The feed including the hydrocarbon oil may contain calcium, iron, zinc, nickel, sodium, potassium, and other metals, and such metal components are liable to cause corrosion of a refining device in the feed refining process or to form precipitates in the refining device. In an embodiment of the present invention, the metal removal process is responsible for removing calcium, iron or mixtures thereof from the feed.

As the feed, crude oil may be obtained from an oil field that has a gas layer at an upper position and a water layer at a lower position, and water present in the oil field may become free water during the excavation, or may be mixed with crude oil to thus form an emulsion. The emulsion of crude oil is stable because an interfacial film is formed on water particles, and such a film is composed of a polar material such as resin or asphaltene having high interfacial activity and high molecular weight, wax, and an inorganic solid. The interfacial film weakens the surface tension of water droplets and increases the interfacial viscosity to thus improve the stability of the emulsion. The interfacial film having a high viscosity functions as a barrier upon coalescence of water particles, thus inhibiting drainage. Hence, the breakage rate of the emulsion is decreased.

The emulsion formed in the feed, such as crude oil, negatively affects the formation of the emulsion using the aqueous solution including a metal scavenger in the subsequent desalting process, and decreases the metal removal efficiency of the desalting process. Thus, in the case where the emulsion is formed in the feed, a demulsifier is added to thus eliminate the emulsion. The amount of the demulsifier may be adjusted depending on the amount of the emulsion of the feed. In an embodiment of the present invention, the feed may contain 1 to 20 ppm of a demulsifier. The demulsifier may be exemplified by a polymer such as polyoxyethylene alkylphenyl ether.

To demulsify the feed, a water-oil separation process may be applied. By virtue of the water-oil separation process, free water may be separated from the hydrocarbon oil, and the separated free water may be utilized in the subsequent desalting process.

Metal Scavenger

In the present invention, the metal scavenger functions such that the metal present in the hydrocarbon oil is removed in the form of a metal salt because the metal may cause problems of corrosion and precipitation in the processing device in the process of treating hydrocarbon oil. The metal includes calcium, iron, zinc, nickel, sodium, potassium, and other metals. In an embodiment of the present invention, the metal scavenger enables calcium, iron or mixtures thereof to be removed horn the hydrocarbon oil.

As the metal scavenger, any acidic material may be used without limitation so long as it may form a metal salt with the metal. However, the metal scavenger used for the hydrocarbon oil is carboxylic acid composed of carbon, hydrogen and oxygen, without other impurities, hi an embodiment of the present invention, the metal scavenger may be selected from the group consisting of adipic acid, malonic acid, glutaric acid, pyruvic acid, 3-hydroxypropanoic acid, mesaconic acid, and derivatives thereof. Also according to an embodiment of the present invention, in order to remove both calcium and iron from the hydrocarbon oil, the metal scavenger may include malonic acid or pyruvic acid. In the present process, the metal scavenger is not necessarily used alone, but may be used in combination as necessary.

The metal scavenger may be directly added in a solid or liquid phase, or may be added in a high-concentration solution phase by being dissolved in a diluting agent. The mixing process may be performed using a mixer or an additional stirrer.

The metal scavenger may be added at the first and second positions of FIG. 1, and the total amount of the metal scavenger that is added and the addition ratio at the first and second positions were described in the above metal removal process. The metal scavengers that are added at the first and second positions may be the same as or different from each other. Different metal scavengers may be used to enhance the effect of reducing a single kind of metal. Furthermore, metal scavengers having different removal efficiencies for respective metals may be separately added at the first position and the second position, thereby enabling two or more metals to be simultaneously and efficiently removed.

A better understanding of the present invention is provided through the following examples, which are merely set forth to illustrate and are not to be construed as limiting the present, invention.

EXAMPLE 1

Removal of Calcium from Feed Containing 50 ppm of Calcium (Addition of Entire Amount at First Position)

Doha crude oil native to West Africa (Chad) was mixed with typical crude oil, thus preparing a feed including hydrocarbon oil so that the calcium concentration was an average of 50 ppm based on the results of analysis of ICP (Induced Coupling Plasma).

The feed was added with 0.8 equivalents of an adipic acid aqueous solution relative to the calcium concentration and then mixed at about 90° C. for about 3 min using a mixer, thus preparing a first mixture.

The prepared first mixture was transferred into a glass tube of an EST (Emulsion Stability tester). The glass tube containing the sample was placed in the EST, and the EST was operated at 4000 Volts, 90° C. and 1 bar for 30 min so as to facilitate the water-oil separation.

After the completion of water-oil separation, the separated aqueous solution phase was discharged to the outside, and the separated hydrocarbon phase was added with washing water in an amount of about 5 wt % based on the weight of the hydrocarbon phase, and then mixed under the same reaction conditions as in the preparation of the first mixture, thus obtaining a second mixture. The second mixture was subjected to water-oil separation using an EST under the same reaction conditions as in the desalting process of the first mixture.

After the completion of water-oil separation of the second mixture, the separated aqueous solution phase was recirculated and further mixed with the feed, and the separated hydrocarbon phase was recovered. The recovered hydrocarbon phase was sampled, and then the amount of calcium in the hydrocarbon was measured through ICP.

Furthermore, a different metal scavenger was used under the same reaction conditions, tints additionally measuring the amount of calcium in the hydrocarbon. The metal scavenger for additionally measuring the calcium removal efficiency includes malonic acid, glutaric acid, pyruvic acid, 3-hydroxypropanoic acid, and mesaconic acid. Since pyruvic acid and mesaconic acid are monocarboxylic acid compounds, unlike the dicarboxylic acid metal scavenger, they were each added in an amount of 1.6 equivalents, corresponding to two-fold equivalents.

COMPARATIVE EXAMPLE 1

Figure 2:
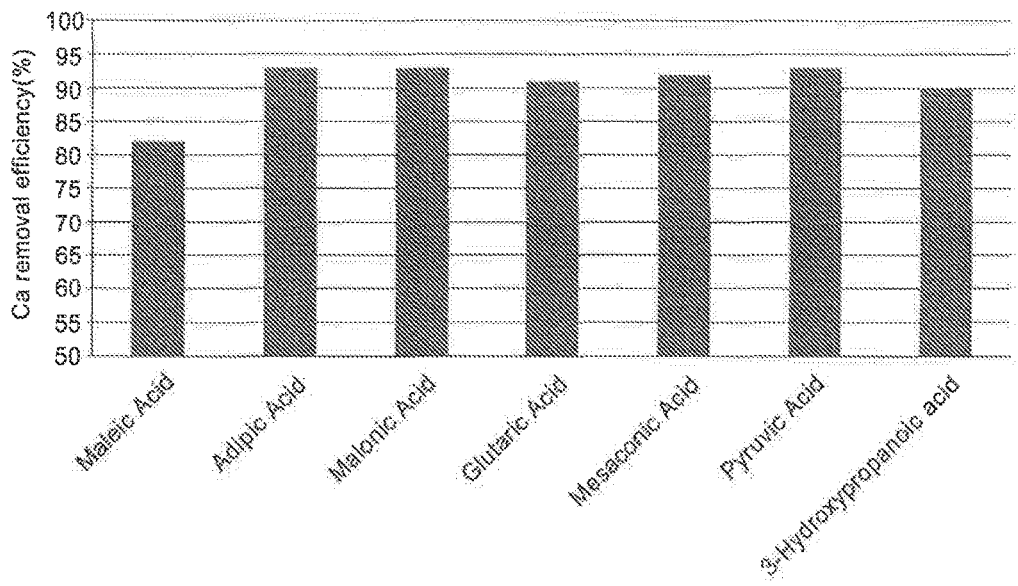
FIG. 2 is a graph illustrating the efficiency of calcium removal from a feed containing 50 ppm of calcium when a metal scavenger is added entirely at the first position of FIG. 1.

The calcium removal process was performed using 0.8 equivalents of maleic acid as a conventional metal scavenger, and the other conditions were the same as in Example 1. The calcium removal efficiencies of Example 1 and Comparative Example 1 are shown in Table 1 below and in FIG. 2.

TABLE 1

Efficiency of calcium removal from feed containing 50 ppm of Ca (addition of entire amount at first position)

| Metal scavenger | Amount of added metal scavenger (Equivalents) | Ca removal efficiency (%) |
| --- | --- | --- |
| Maleic acid (Comp. Ex.) | 0.8 | 82 |
| Adipic acid | 0.8 | 93 |
| Malonic acid | 0.8 | 93 |
| Glutaric acid | 0.8 | 91 |
| Mesaconic acid | 0.8 | 92 |
| Pyruvic acid | 1.6 | 93 |
| 3-Hydroxypropanoic acid | 1.6 | 90 |

As apparent from Table 1, compared to maleic acid of Comparative Example as the conventional metal scavenger, according to the present invention, adipic acid, malonic acid, glutaric acid, mesaconic acid, pyruvic acid, or 3-hydroxypropanoic acid exhibited high calcium removal efficiency as the calcium scavenger.

EXAMPLE 2

Removal of Calcium from Feed Containing 120 ppm of Calcium (Addition of Entire Amount at First Position)

Hydrocarbon oil containing 12.0 ppm of calcium was used as the feed, and the other conditions were the same as in Example 1.

COMPARATIVE EXAMPLE 2

Figure 3:
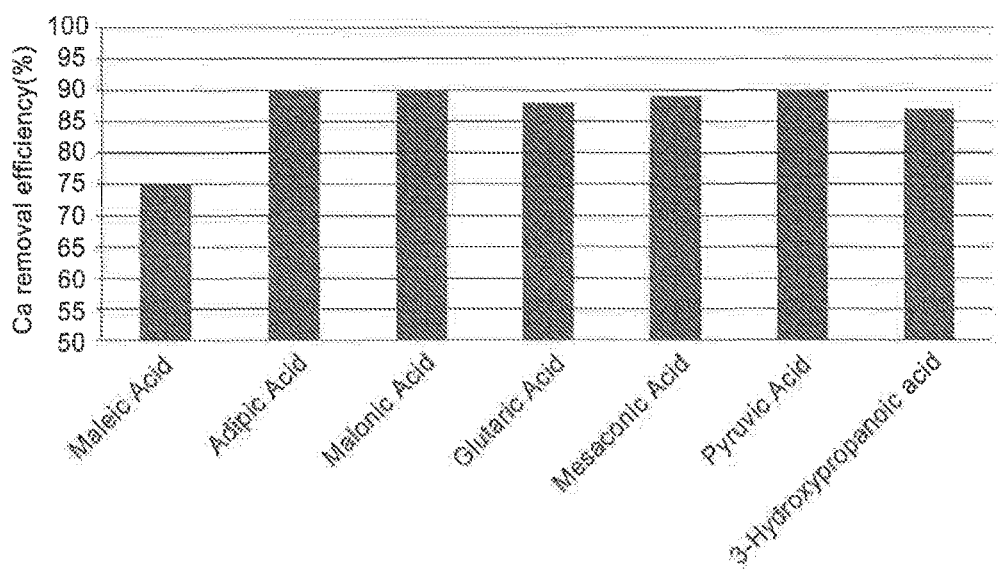
FIG. 3 is a graph illustrating the efficiency of calcium removal from a feed containing 120 ppm of calcium when a metal scavenger is added entirely at the first position of FIG. 1.

The calcium removal process was performed using 0.8 equivalents of maleic acid as the conventional metal scavenger, and the other conditions were the same as in Example 2, The calcium removal efficiencies of Example 2 and Comparative Example 2 are shown in Table 2 below and in FIG. 3.

TABLE 2

Efficiency of calcium removal from feed containing 120 ppm of Ca (addition of entire amount at first position)

| Metal scavenger | Amount of added metal scavenger (Equivalents) | Ca removal efficiency (%) |
| --- | --- | --- |
| Maleic acid (Comp. Ex.) | 0.8 | 75 |
| Adipic acid | 0.8 | 90 |
| Malonic acid | 0.8 | 90 |
| Glutaric acid | 0.8 | 88 |
| Mesaconic acid | 0.8 | 89 |
| Pyruvic acid | 1.6 | 90 |
| 3-Hydroxypropanoic acid | 1.6 | 87 |

As is apparent from Table 2, when using the feed containing 120 ppm of calcium, the calcium removal efficiency was low compared to when using the feed containing 50 ppm of calcium. Like Table 1, however, the metal scavenger according to the present invention exhibited high calcium removal efficiency compared to when using maleic acid as the conventional metal scavenger.

EXAMPLE 3

Removal of Calcium from Feed Containing 50 ppm of Calcium (Divided Addition at First and Second Positions)

Unlike Example 1, the metal scavenger was divided and added at the first and second positions of FIG. 1. The weight ratio of the amount of the metal scavenger added at the first position to the amount of the metal scavenger added at the second position (first position/second position) was adjusted to 0.25, 1 and 4, and the calcium removal efficiency was measured. The total equivalents of the metal scavenger added at the first and second positions were the same as in Example 1. The conditions, with the exception that the metal scavenger was dividedly added, were the same as in Example 1.

COMPARATIVE EXAMPLE 3

Figure 4:
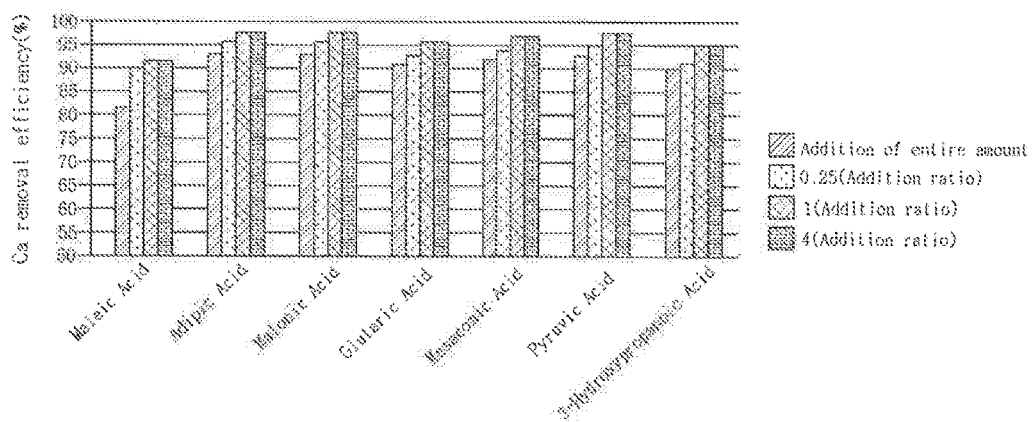
FIG. 4 is a graph illustrating the efficiency of calcium removal from a feed containing 50 ppm of calcium when a metal scavenger is divided and added at the first and second positions of FIG. 1.

The calcium removal process was performed using 0.8 equivalents (total amount of added metal scavenger) of maleic acid as the conventional metal scavenger, and the other conditions were the same as in Example 3. The calcium removal efficiencies of Example 3 and Comparative Example 3 are shown in Table 3 below and in FIG. 4.

TABLE 3

Efficiency of calcium removal from feed containing 50 ppm of Ca (divided addition at first and second positions)

| | | Ca removal efficiency (%) | | |
| --- | --- | --- | --- | --- |
| | | Divided addition (first/second positions) | | |
| Metal scavenger | Addition of entire amount | 0.25 (Addition ratio) | 1 (Addition ratio) | 4 (Addition ratio) |
| Maleic acid | 82 | 90 | 92 | 92 |
| Adipic acid | 93 | 96 | 98 | 98 |
| Malonic acid | 93 | 96 | 98 | 98 |
| Glutaric acid | 91 | 93 | 96 | 96 |
| Mesaconic acid | 92 | 94 | 97 | 97 |
| Pyruvic acid | 93 | 95 | 98 | 98 |
| 3-Hydroxypropanoic acid | 90 | 92 | 95 | 95 |

As is apparent from Table 3, the divided addition of the metal scavenger exhibited high calcium removal efficiency compared to the singular addition of the entire amount thereof. Also, upon the divided addition of the metal scavenger, when the first position/second position ratio was 1 to 4, higher calcium removal efficiency resulted.

EXAMPLE 4

Removal of Calcium from Feed Containing 120 ppm of Calcium (Divided Addition at First and Second Positions)

Hydrocarbon oil containing 120 ppm of calcium was used as the feed, and the other conditions were the same as in Example 3.

COMPARATIVE EXAMPLE 4

Figure 5:
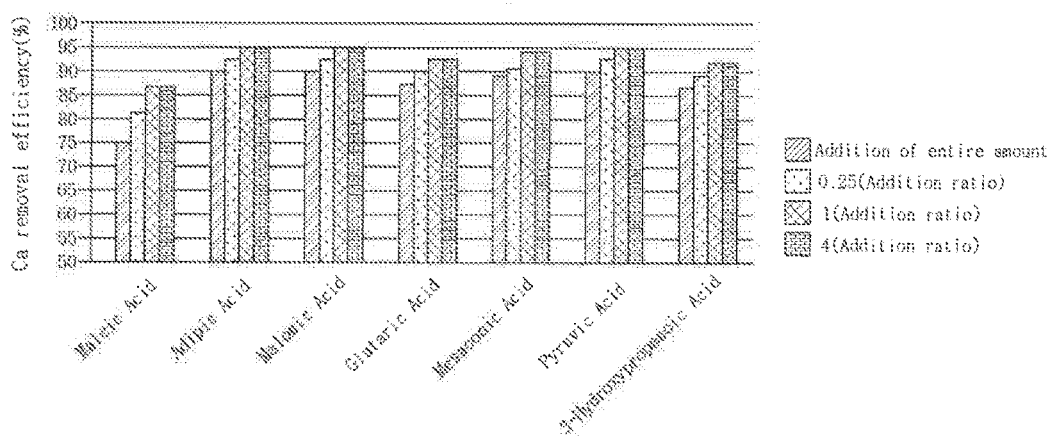
FIG. 5 is a graph illustrating the efficiency of calcium removal from a feed containing 120 ppm of calcium when a metal scavenger is divided and added at the first and second positions of FIG. 1.

The calcium removal process was performed using 0.8 equivalents (total amount of added metal scavenger) of maleic acid, as the conventional metal scavenger, and the other conditions were the same as in Example 4. The calcium removal efficiencies of Example 4 and Comparative Example 4 are shown in Table 4 below and in FIG. 5.

TABLE 4

Efficiency of calcium removal from feed containing 120 ppm of Ca (divided addition at first and second positions)

| | | Ca removal efficiency (%) | | |
| --- | --- | --- | --- | --- |
| | | Divided addition (first/second positions) | | |
| Metal scavenger | Addition of entire amount | 0.25 (Addition ratio) | 1 (Addition ratio) | 4 (Addition ratio) |
| Maleic acid | 75 | 82 | 87 | 87 |
| Adipic acid | 90 | 93 | 95 | 95 |
| Malonic acid | 90 | 93 | 95 | 95 |
| Glutaric acid | 88 | 90 | 93 | 93 |
| Mesaconic acid | 89 | 91 | 94 | 94 |
| Pyruvic acid | 90 | 92 | 95 | 95 |
| 3-Hydroxypropanoic acid | 87 | 89 | 92 | 92 |

As is apparent from Table 4, when using the feed containing 120 ppm of calcium, the 5 calcium removal efficiency was decreased compared to when using the feed containing 50 ppm of calcium. However, as for the divided addition of the metal scavenger, the same tendency as shown in Table 3 was exhibited.

EXAMPLE 5

Removal of Iron from Feed Containing 10 ppm of Iron (Addition of Entire Amount at First position)

The feed containing 10 ppm of iron was used, and as the metal scavenger, 1.2 equivalents of malonic acid (dicarboxylic acid) or 2.4 equivalents of pyruvic acid (monocarboxylic acid) relative to the amount of iron in the feed was used, so that the iron removal efficiency was measured from the feed, The other conditions were the same as in Example 1. The iron removal efficiency of Example 5 is shown in Table 5 below.

TABLE 5

Efficiency of iron removal from feed containing 10 ppm of Fe (addition of entire amount at first position)

| Metal scavenger | Amount of added metal scavenger (Equivalents) | Fe removal efficiency (%) |
| --- | --- | --- |
| Malonic acid | 1.2 | 70 |
| pyruvic acid | 2.4 | 68 |

As is apparent from Table 5, the use of malonic acid or pyruvic acid as the metal scavenger was effective at removing iron, compared to the other metal scavengers.

EXAMPLE 6

Removal of Iron from Feed Containing 20 ppm of Iron (Addition of Entire Amount at First Position)

Hydrocarbon oil containing 20 ppm of iron was used as the feed, and the other conditions were the same as in Example 5. The iron removal efficiency of Example 6 is shown in Table 6 below.

TABLE 6

Efficiency of iron removal from feed containing 20 ppm of Fe
(addition of entire amount at first position)

| Metal scavenger | Amount of added metal scavenger (Equivalents) | Fe removal efficiency (%) |
|---|---|---|
| Malonic acid | 1.2 | 60 |
| pyruvic acid | 2.4 | 55 |

As is apparent from Table 6, when using the feed containing 20 ppm of iron, the iron removal efficiency was decreased compared to when using the feed containing 10 ppm of iron, but malonic acid or pyruvic acid was still effective at removing iron even when using the feed containing 20 ppm of iron.

EXAMPLE 7

Removal of Iron from Feed Containing 10 ppm of Iron (Divided Addition at First and Second Positions)

Figure 6:
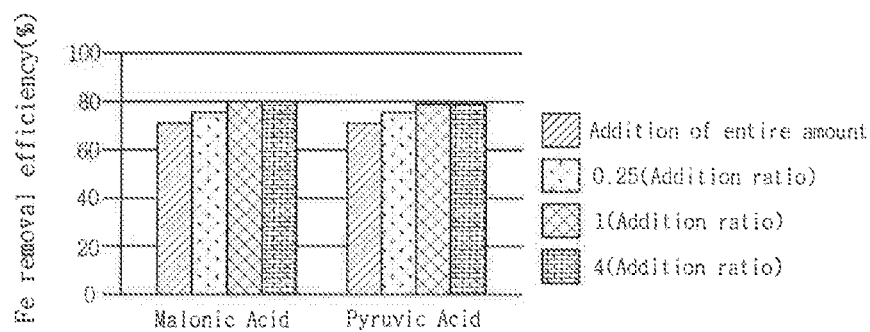
FIG. 6 is a graph illustrating the efficiency of iron removal from a feed containing 10 ppm of iron when a metal scavenger is divided and added at the first and second positions of FIG. 1.

Unlike Example 5, the metal scavenger was divided and added at the first and second positions of FIG. 1, and the weight ratio of the amount of the metal scavenger added at the first position to the amount of the metal scavenger added at the second position (first position/second position) was adjusted to 0.25, 1 and 4, and the iron removal efficiency was measured. The total equivalents of the metal scavenger added at the first and second positions were the same as in Example 5. The conditions, with the exception that the metal scavenger was dividedly added, were the same as in Example 5. The iron removal efficiency of Example 7 is shown in Table 7 below and in FIG. 6.

TABLE 7

Efficiency of iron removal from feed containing 10 ppm of Fe
(divided addition at first and second positions)

| | Fe removal efficiency (%) | | | |
|---|---|---|---|---|
| | | Divided addition (first/second positions) | | |
| Metal scavenger | Addition of entire amount | 0.25 (Addition ratio) | 1 (Addition ratio) | 4 (Addition ratio) |
| Malonic acid | 70 | 75 | 80 | 80 |
| pyruvic acid | 68 | 73 | 79 | 79 |

As is apparent from Table 7, the metal scavenger exhibited higher iron removal efficiency upon divided addition than upon singular addition of The entire amount thereof. Also, upon divided addition of the metal scavenger, when the first position/second position ratio was 1 to 4, higher iron removal efficiency resulted.

EXAMPLE 8

Removal of Iron from Feed Containing 20 ppm of Iron (Divided Addition at First and Second Positions)

Figure 7:
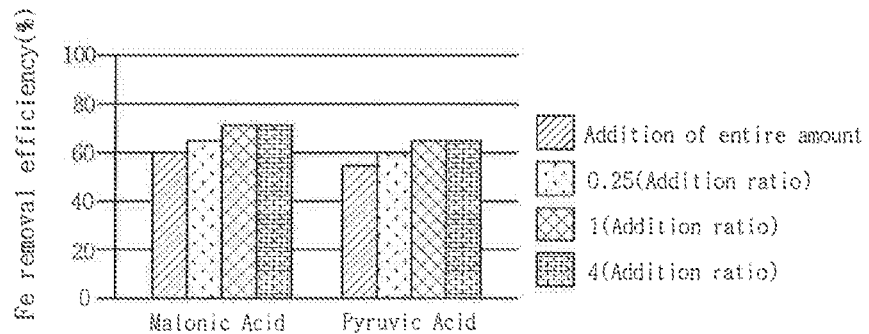
FIG. 7 is a graph illustrating the efficiency of iron removal from a feed containing 20 ppm of iron when a metal scavenger is divided and added at the first and second positions of FIG. 1.

Hydrocarbon oil containing 20 ppm of iron was used as the feed, and the other conditions were the same as in Example 8. The iron removal efficiency of Example 8 is shown in Table 8 below and in FIG. 7.

TABLE 8

Efficiency of iron removal from feed containing 20 ppm of Fe
(divided addition at first and second positions)

| | Fe removal efficiency (%) | | | |
|---|---|---|---|---|
| | | Divided addition (first/second positions) | | |
| Metal scavenger | Addition of entire amount | 0.25 (Addition ratio) | 1 (Addition ratio) | 4 (Addition ratio) |
| Malonic acid | 60 | 65 | 70 | 70 |
| pyruvic acid | 55 | 60 | 65 | 65 |

As is apparent from Table 8, when using the feed containing 20 ppm of iron, the iron removal efficiency was decreased compared to when using the feed containing 10 ppm of iron. However, as for the divided addition of the metal scavenger, the same tendency as shown in Table 7 was manifested.

EXAMPLE 9

Removal Of Calcium from Feed Containing 50 ppm of Calcium (Combination Addition)

Unlike Example 3, when the metal scavenger was divided and added at the first and second positions of FIG. 1, the metal scavenger added at the second position was different from the metal scavenger added at the first position. The specific addition conditions and the calcium removal efficiency are shown in Table 9 below.

TABLE 9

Efficiency of calcium removal from feed containing 50 ppm of Ca
(combination addition)

| | Metal scavenger | Addition position of metal scavenger | Amount of added metal scavenger (equivalents) | Ca removal efficiency (%) |
|---|---|---|---|---|
| Ex. 9-1 | Maleic acid | $1^{st}$ position | 1.0 | 95 |
| | Malonic acid | $2^{nd}$ position | 0.2 | |
| Ex. 9-2 | Maleic acid | $1^{st}$ position | 1.0 | 94 |
| | Pyruvic acid | $2^{nd}$ position | 0.2 | |
| Ex. 9-3 | Malonic acid | $1^{st}$ position | 1.0 | 98 |
| | Pyruvic acid | $2^{nd}$ position | 0.4 | |

EXAMPLE 10

Removal of Calcium from Feed Containing 120 ppm of Calcium (Combination Addition)

Hydrocarbon oil containing 120 ppm of calcium was used as the feed, and the other conditions were the same as in Example 9. The specific addition conditions and the calcium removal efficiency are shown in Table 10 below.

TABLE 10

Efficiency of calcium removal from feed containing 120 ppm of Ca
(combination addition)

| | Metal scavenger | Addition position of metal scavenger | Amount of added metal scavenger (equivalents) | Ca removal efficiency (%) |
|---|---|---|---|---|
| Ex. 10-1 | Maleic acid | $1^{st}$ position | 1.0 | 91 |
| | Malonic acid | $2^{nd}$ position | 0.2 | |

TABLE 10-continued

Efficiency of calcium removal from feed containing 120 ppm of Ca (combination addition)

| | Metal scavenger | Addition position of metal scavenger | Amount of added metal scavenger (equivalents) | Ca removal efficiency (%) |
|---|---|---|---|---|
| Ex. 10-2 | Maleic acid | 1$^{st}$ position | 1.0 | 90 |
| | Pyruvic acid | 2$^{nd}$ position | 0.2 | |
| Ex. 10-3 | Malonic acid | 1$^{st}$ position | 1.0 | 95 |
| | Pyruvic acid | 2$^{nd}$ position | 0.4 | |

EXAMPLE 11

Removal of Iron from Feed Containing 10 ppm of Iron (Combination Addition)

Hydrocarbon oil containing 10 ppm of iron was used as the feed, and the other conditions were the same as in Example 9. The specific addition conditions and the iron removal efficiency are shown in Table 11 below.

TABLE 11

Efficiency of iron removal from feed containing 10 ppm of Fe (combination addition)

| | Metal scavenger | Addition position of metal scavenger | Amount of added metal scavenger (equivalents) | Fe removal efficiency (%) |
|---|---|---|---|---|
| Ex. 11-1 | Maleic acid | 1$^{st}$ position | 1.0 | 60 |
| | Malonic acid | 2$^{nd}$ position | 0.2 | |
| Ex. 11-2 | Maleic acid | 1$^{st}$ position | 1.0 | 50 |
| | Pyruvic acid | 2$^{nd}$ position | 0.2 | |
| Ex. 11-3 | Malonic acid | 1$^{st}$ position | 1.0 | 70 |
| | Pyruvic acid | 2$^{nd}$ position | 0.4 | |

EXAMPLE 12

Removal of Iron from Feed Containing 20 ppm of Iron (Combination Addition)

Hydrocarbon oil containing 20 ppm of iron was used as the feed, and the other conditions were the same as in Example 9. The specific addition conditions and the iron removal efficiency are shown in Table 12 below.

TABLE 12

Efficiency of iron removal from feed containing 20 ppm of Fe (combination addition)

| | Metal scavenger | Addition position of metal scavenger | Amount of added metal scavenger (equivalents) | Fe removal efficiency (%) |
|---|---|---|---|---|
| Ex. 12-1 | Maleic acid | 1$^{st}$ position | 1.0 | 50 |
| | Malonic acid | 2$^{nd}$ position | 0.2 | |
| Ex. 12-2 | Maleic acid | 1$^{st}$ position | 1.0 | 40 |
| | Pyruvic acid | 2$^{nd}$ position | 0.2 | |
| Ex. 12-3 | Malonic acid | 1$^{st}$ position | 1.0 | 60 |
| | Pyruvic acid | 2$^{nd}$ position | 0.4 | |

As is apparent from Examples 9 to 12, when the different metal scavengers were used at the first and second positions, the metal scavenger having relatively low metal removal efficiency could be supplemented. In particular, when maleic acid (first position) and malonic acid (second position) were used in combination, and when maleic acid (first position) and pyruvic acid (second position) were used in combination, significantly improved calcium and iron removal efficiencies were exhibited compared to when using the conventional maleic acid metal scavenger.

Accordingly, simple modifications or variations of the present invention tall within the scope of the present invention as defined in the accompanying claims.

What is claimed is:

1. A method of removing a metal from hydrocarbon oil, comprising:
    (a) supplying a feed including hydrocarbon oil;
    (b) mixing the feed with an aqueous solution including a metal scavenger to prepare a first mixture;
    (c) separating the first mixture into a first aqueous solution phase and a first hydrocarbon phase, and discharging the separated first aqueous solution phase;
    (d) mixing the first hydrocarbon phase, separated in (c), with washing water to produce a second mixture;
    (e) separating the second mixture into a second aqueous solution phase and a second hydrocarbon phase; and
    (f) recovering the separated second hydrocarbon phase and recirculating the separated second aqueous solution phase back to (b),
    wherein(d), the separated first hydrocarbon phase is further mixed with an additional metal scavenger, as well as the washing water,
    wherein a weight ratio of the metal scavenger in (b) to the additional metal scavenger in (d) (a weight of the metal scavenger in (b)/a weight of the additional metal scavenger in (d) ranges from 1 to 4,
    wherein the additional metal scavenger in (d) is different from the metal scavenger in (b).

2. The method of claim 1, wherein the first metal scavenger removes calcium, iron or mixtures thereof from the hydrocarbon oil.

3. The method of claim 1, wherein the first metal scavenger is selected from the group consisting of adipic acid, malonic acid, glutaric acid, pyruvic acid, 3-hydroxypropanoic acid, mesaconic acid, and derivatives thereof.

4. The method of claim 1, wherein the first metal scavenger comprises malonic acid or pyruvic acid.

5. The method of claim 1, wherein the hydrocarbon oil comprises 1 to 120 ppm of calcium and 1 to 20 ppm of iron.

6. The method of claim 1, wherein the mixing in (b) and (d) is performed by changing pressure in pipes at 10 to 200° C. for 1 sec to 2 hr, and a change in pressure ranges from 0.3 to 5.0 kgf/cm$^2$.

7. The method of claim 1, comprising separating both said first aqueous solution phase and first hydrocarbon phase and said second hydrocarbon phase and said second aqueous solution at a temperature of 90 to 160° C. and a pressure of 1 to 20 bar.

8. The method of claim 1, comprising adding said first metal scavenger in an amount corresponding to a molar ratio of 0.5 to 10 times as much as an amount of calcium of the hydrocarbon oil.

9. The method of claim 1, comprising adding the washing water in an amount of 3 to 10 wt% based on weight of the hydrocarbon oil.

10. The method of claim 1, wherein said feed further comprises 1 to 20 ppm of a demulsifier.

11. The method of claim 1, comprising separating said first aqueous solution and first hydrocarbon phase, and said second aqueous phase and second hydrocarbon phase with a device selected from the group consisting of a heater treater, an emulsion treater, a free water knockout vessel, and an electrostatic heater treater.

12. The method of claim 1, wherein said feed is crude oil, atmosphetic residue, vacuum residue, shale oil, oil sands, liquefied coal oil, or tar sand.

* * * * *